United States Patent
Tsumagari

(10) Patent No.: US 7,543,443 B2
(45) Date of Patent: Jun. 9, 2009

(54) METHOD FOR DETERMINING $NO_x$ REDUCTION RATIO IN EXHAUST EMISSION CONTROL DEVICE

(75) Inventor: Ichiro Tsumagari, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 11/632,998

(22) PCT Filed: Jul. 21, 2005

(86) PCT No.: PCT/JP2005/013365

§ 371 (c)(1),
(2), (4) Date: Jan. 22, 2007

(87) PCT Pub. No.: WO2006/009196

PCT Pub. Date: Jan. 26, 2006

(65) Prior Publication Data

US 2007/0199307 A1    Aug. 30, 2007

(30) Foreign Application Priority Data

Jul. 23, 2004  (JP) .............................. 2004-215767

(51) Int. Cl.
 *F01N 3/00*    (2006.01)
(52) U.S. Cl. .............................. 60/277; 60/274; 60/276; 60/286; 60/295; 60/301
(58) Field of Classification Search .................... 60/274, 60/276, 286, 295, 301, 277
See application file for complete search history.

(56) References Cited

U.S. PATENT DOCUMENTS

| | | | |
|---|---|---|---|
| 4,751,054 A * | 6/1988 | Watanabe | .................... 422/111 |
| 6,119,448 A | 9/2000 | Emmerling et al. | |
| 6,415,602 B1 * | 7/2002 | Patchett et al. | ................. 60/286 |
| 6,481,201 B2 * | 11/2002 | Kako et al. | .................... 60/285 |
| 6,755,014 B2 * | 6/2004 | Kawai et al. | .................. 60/286 |
| 2003/0051468 A1 | 3/2003 | Van Nieuwstadt et al. | |

FOREIGN PATENT DOCUMENTS

EP    1 024 254    8/2000

(Continued)

*Primary Examiner*—Thomas E Denion
*Assistant Examiner*—Diem Tran
(74) *Attorney, Agent, or Firm*—Oblon, Spivak, McClelland, Maier & Neustadt, P.C.

(57) ABSTRACT

When urea water U is injected by an addition nozzle 7 upstream of $NO_x$ reduction catalyst 6 incorporated in an exhaust passage 5 of a diesel engine 1 so as to reduce and purify $NO_x$ in exhaust G, both a value measured by a $NO_x$ concentration sensor 9 upstream of the nozzle 7 and a value measured by a $NO_x$ concentration sensor 12 downstream of the catalyst 6 are corrected by using a primary response model depending upon a flow rate and a temperature of exhaust G. The $NO_x$ reduction ratio is obtained on the basis of these corrected $NO_x$ concentration values. Rectified are time lag of measuring of a value by the downstream $NO_x$ concentration sensor 12 from measuring of a value by the upstream $NO_x$ concentration sensor 9 in a case of the exhaust G having a lower flow rate, and error due to lowering of $NO_x$ reduction processing speed in a case of the exhaust having a lower temperature.

16 Claims, 3 Drawing Sheets

FOREIGN PATENT DOCUMENTS

| | | |
|---|---|---|
| EP | 1 334 760 | 8/2003 |
| JP | 04-338214 * | 11/1992 |
| JP | 7 83073 | 3/1995 |
| JP | 11 229850 | 8/1999 |
| JP | 11 257053 | 9/1999 |
| JP | 11-267451 * | 10/1999 |
| JP | 2000 352306 | 12/2000 |
| JP | 2002 47979 | 2/2002 |
| JP | 2002 513110 | 5/2002 |
| JP | 2002 161732 | 6/2002 |

* cited by examiner

METHOD FOR DETERMINING $NO_X$ REDUCTION RATIO IN EXHAUST EMISSION CONTROL DEVICE

TECHNICAL FIELD

The present invention relates to a method for determining a $NO_x$ reduction ratio in an exhaust emission control device.

BACKGROUND ART

There has been proposed an exhaust emission control device (see, for example, References 1 and 2) with selective reduction catalyst ($NO_x$ reduction catalyst) which causes nitrogen oxides ($NO_x$) to selectively react with a reducing agent even in the presence of oxygen, the catalyst being incorporated in an exhaust passage of a diesel engine for a vehicle to thereby attain reduction in discharged $NO_x$ concentration; the reducing agent used is urea water capable of being more easily dealt with than ammonia.

In such exhaust emission control device, a nozzle (reducing-agent addition means) is arranged to add the urea water upstream of the catalyst. Addition of the urea water with a temperature of the catalyst being more than about 200° C. causes the urea water to be decomposed into ammonia and carbon monoxide, and $NO_x$ in the exhaust gas is reduced and purified by ammonia through the catalyst.

Any surplus ammonia is once adsorbed to the catalyst and then contributes to reduction treatment of $NO_x$.

[Reference 1] JP 2002-161732A
[Reference 2] JP 2002-513110A

SUMMARY OF THE INVENTION

Problems to be Solved by the Invention

In the exhaust emission control device as mentioned above, a $NO_x$ reduction ratio is determined by subtracting a $NO_x$ concentration value measured downstream of the catalyst from a $NO_x$ concentration value measured upstream of a position where the reducing agent is added. The determined reduction ratio is used for controlling urea water consumption and an amount of the urea water to be added upstream of the catalyst.

However, when the exhaust has a lower flow rate, time lag of measuring of a downstream $NO_x$ concentration value from that of an upstream $NO_x$ concentration value will increase; when the exhaust has a lower temperature, the $NO_x$ reduction processing speed will be lowered. Thus, the $NO_x$ reduction ratio cannot be accurately determined by mere subtraction of the measured downstream $NO_x$ concentration value from the measured upstream $NO_x$ concentration value.

The invention was made in view of the above and has its object to make it possible to accurately determine a $NO_x$ reduction ratio in an exhaust emission control device.

Means or Measures for Solving the Problems

In order to attain the above object, the invention is directed to a method for determining a $NO_x$ reduction ratio in an exhaust emission control device with a reducing agent being added upstream of $NO_x$ reduction catalyst incorporated in an exhaust passage of an engine so as to reduce and purify $NO_x$ in the exhaust, comprising using a primary response model depending upon a flow rate and a temperature of the exhaust to correct a $NO_x$ concentration value measured upstream of a position where the reducing agent is added and a $NO_x$ concentration value measured downstream of the catalyst, and determining the $NO_x$ reduction ratio on the basis of the corrected $NO_x$ concentration values.

In the invention, upon determination of the $NO_x$ reduction ratio in the exhaust of the engine, the primary response model depending upon the flow rate and temperature of the exhaust is used to correct the $NO_x$ concentration value measured in the exhaust before addition of the reducing agent and the $NO_x$ concentration value measured in the exhaust after its passing through the catalyst.

Effects of the Invention

According to a method for determining a $NO_x$ reduction ratio in an exhaust emission control device of the invention, the following excellent effects and advantages can be obtained.

(1) The primary response model depending upon the flow rate and temperature of the exhaust is used as means for correcting the measured $NO_x$ concentration values. Thus, time lag of measuring of the downstream $NO_x$ concentration value from measuring of the upstream $NO_x$ concentration in a case of the exhaust having a lower flow rate as well as error due to lowering of the $NO_x$ reduction processing speed in a case of the exhaust having a lower temperature are rectified, so that the $NO_x$ reduction ratio can be accurately determined.

(2) Correction by the primary response model accompanies a filtering effect, so that background in the measured $NO_x$ concentration values can be reduced.

(3) An amount of the reducing agent to be added upstream of the $NO_x$ reduction catalyst may be properly regulated on the basis of the determined $NO_x$ reduction ratio, which contributes to saving of the reducing agent.

Figure 1:
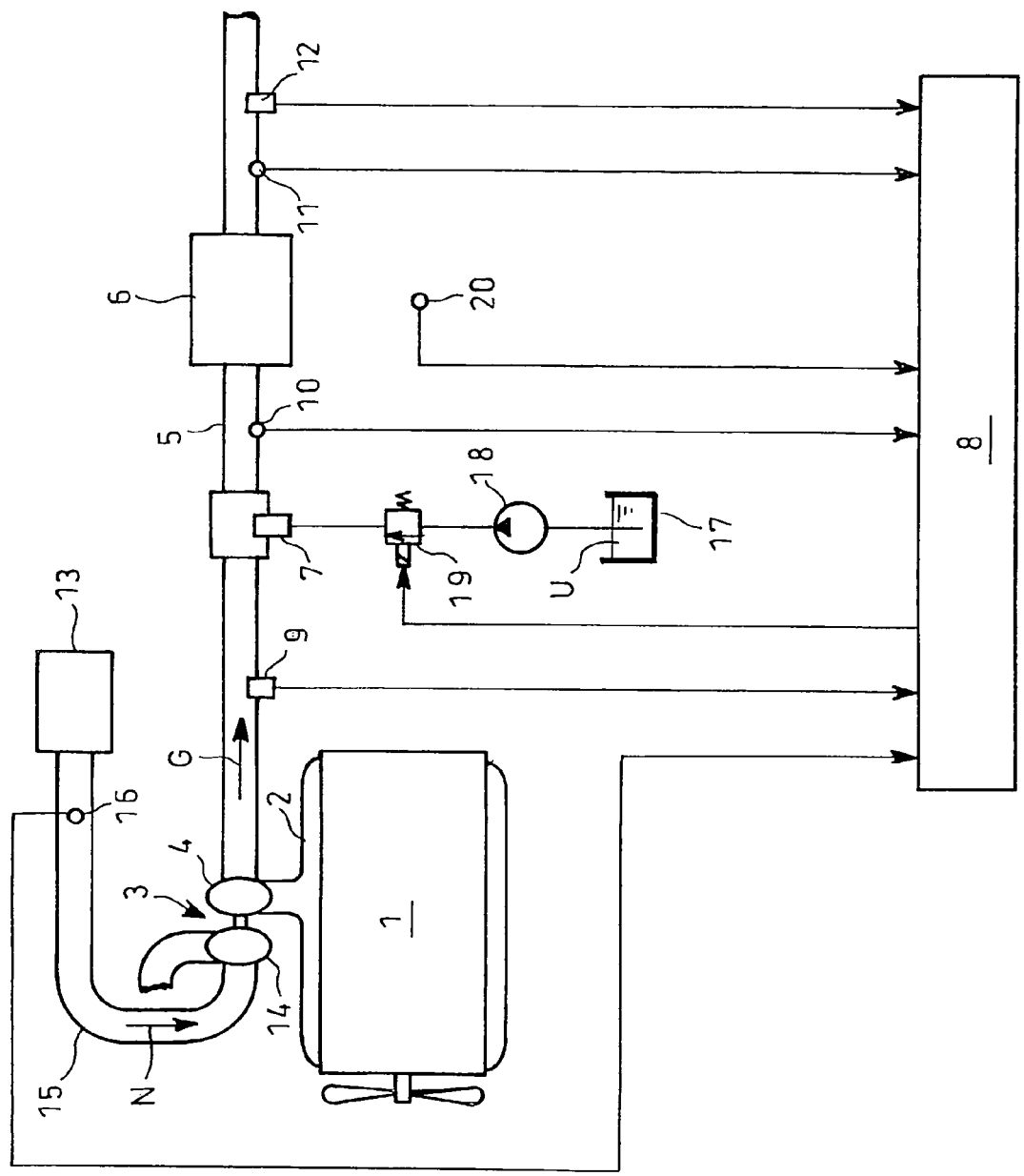
FIG. 1 A schematic view exemplifying an exhaust emission control device to which the invention may be applied.
Figure 2:
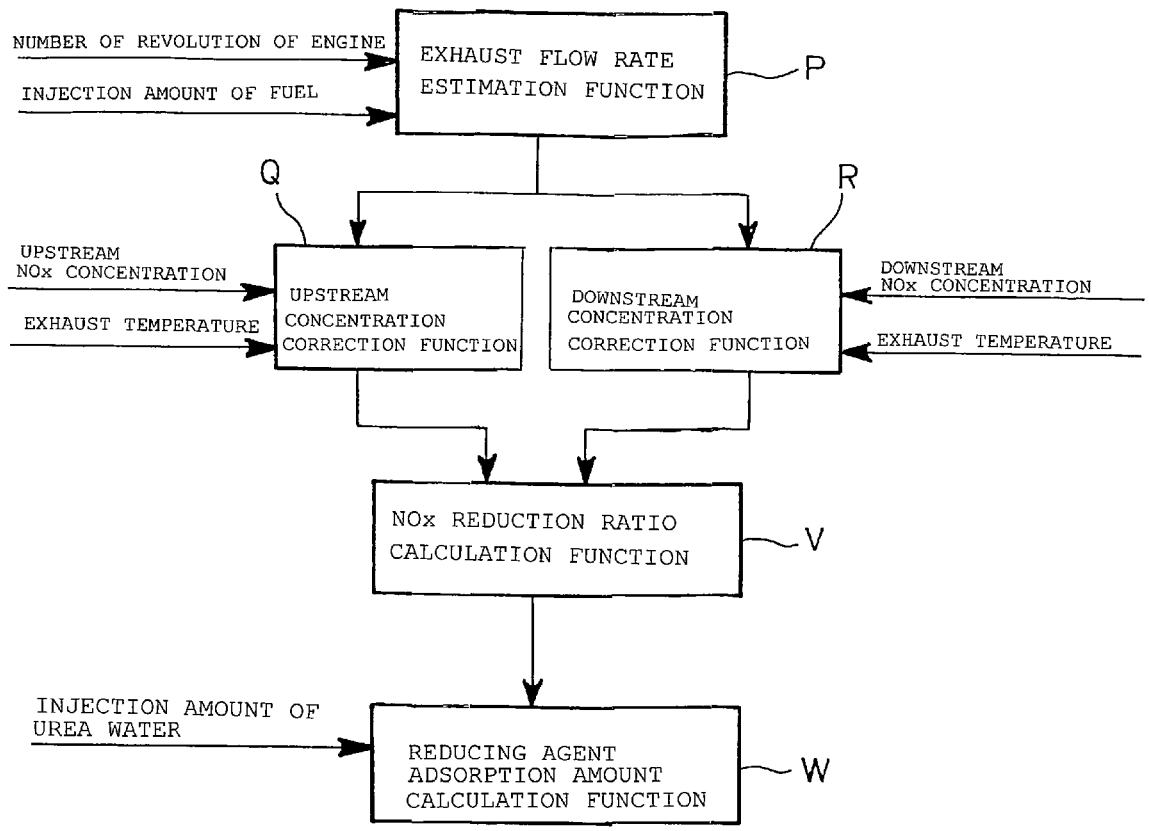
FIG. 2 A block diagram for an arithmetic unit in FIG. 1.

EXPLANATION OF THE REFERENCE NUMERALS 5 exhaust passage
6 reduction catalyst
G exhaust
U urea water (reducing agent)

BEST MODE FOR CARRYING OUT THE INVENTION

An embodiment of the invention will be described.

FIGS. 1-4 show the embodiment of the invention with $NO_x$ reduction catalyst 6 incorporated in an exhaust passage 5 through which exhaust G from an exhaust manifold 2 of a diesel engine 1 flows via a turbine 4 of a turbocharger 3, an addition nozzle 7 which sprays urea water U to the exhaust G upstream the catalyst 6, and an arithmetic unit 8.

Built in the exhaust passage 5 are a $NO_x$ concentration sensor 9 upstream of the nozzle 7, a temperature sensor 10 on an entry side of the catalyst 6 and a temperature sensor 11 and a NO$_x$ concentration sensor 12 on an exit side of the catalyst 6.

Built in an intake air passage 15 from an air cleaner 13 to a compressor 14 of the turbocharger 3 is an air flow sensor 16 for detecting a flow rate of air N.

Connected to the nozzle 7 via an electromagnetic valve 19 is a pump 18 which sucks and delivers the urea water U stored in a tank 17.

The arithmetic unit 8 has exhaust flow rate estimation function P, upstream concentration correction function Q, downstream concentration correction function R, NO$_x$ reduction ratio calculation function V, and reducing agent adsorption amount calculation function W.

The exhaust flow rate estimation function P is such that the flow rate of the exhaust G is estimated on the basis of number of revolution of the engine and injection amount of fuel. The flow rate of the exhaust G may be alternatively estimated on the basis of flow rate of the air N (intake air amount) detected by the sensor 16 and outside air temperature detected by the sensor 20.

The upstream concentration correction function Q is such that the measured value of the NO$_x$ concentration sensor 9 is corrected by the primary response model on the basis of the exhaust flow rate and exhaust temperature detected by the temperature sensor 10. The downstream concentration correction function R is such that the measured value of the NO$_x$ concentration sensor 12 is corrected by the primary response model on the basis of the exhaust flow rate and the exhaust temperature sensed by the temperature sensor 11.

$$\text{corrected upstream concentration value} = \text{measured upstream concentration value } (m-x)(A+Bs)/(1+Cs)$$

$$\text{corrected downstream concentration value} = \text{measured downstream concentration value } (n)(D+Es)/(1+Fs)$$

where A, B, C, D, E, F and x are coefficients and s is Laplace operator.

Each of the coefficients A, B, C, D, E, F and x is obtained from experiments, C and F being reaction velocity components in terms of exhaust temperature, x being time lag component in terms of exhaust flow rate.

Figure 3:
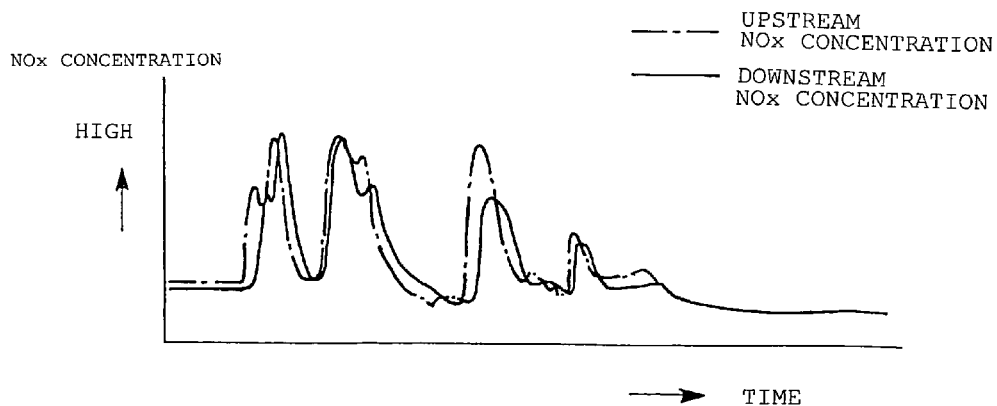
FIG. 3 A diagram showing variation of the measured $NO_x$ value before the correction.
Figure 4:
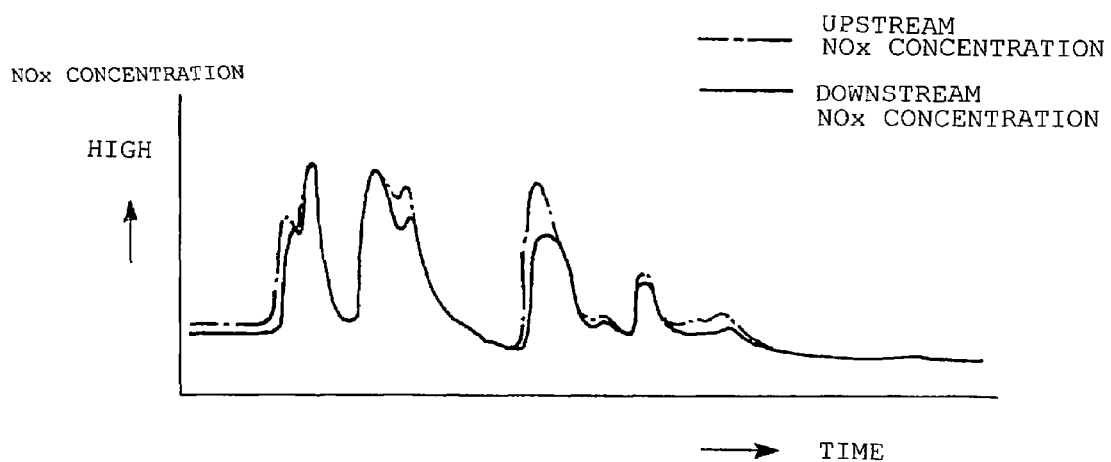
FIG. 4 A diagram showing variation of the measured $NO_x$ value after the correction.

More specifically, as shown in FIG. 3, difference between variation curves of the measured values by the NO$_x$ concentration sensors 9 and 12 in a time zone includes time lag due to distance between the upstream and downstream sensors 9 and 12 and flow velocity of the exhaust G or error in NO$_x$ reduction processing speed due to exhaust temperature. Such time lag and error are removed by the upstream and downstream concentration correction functions Q and R, and thus the rectification as shown in FIG. 4 is effected.

The correction by the primary response model accompanies the filtering effect, so that background in the measured values of the NO$_x$ concentration sensors 9 and 12 can be reduced.

The NO$_x$ reduction ratio calculation function V is such that the NO$_x$ reduction ratio is calculated on the basis of the corrected values of the NO$_x$ concentration sensors 9 and 12. The reducing agent adsorption amount calculation function W is such that an amount of the urea water U contributing to reduction of NO$_x$ is calculated from the NO$_x$ reduction ratio, and adsorption amount of ammonia to the NO$_x$ reduction catalyst 6 is obtained on the basis of the calculated value and the amount of the urea water U added by the nozzle 7 to the exhaust G.

Thus, the NO$_x$ reduction ratio can be accurately determined while removing time lag and error of reduction processing speed. Moreover, an amount of the urea water U to be added upstream of the catalyst 6 can be properly regulated, which contributes to saving of the urea water U.

It is to be understood that a method for determining a NO$_x$ reduction ratio in an exhaust emission control device of the invention is not limited to the above embodiment and that various changes and modifications may be made without departing from the gist of the invention.

INDUSTRIAL APPLICABILITY

A method for determining a NO$_x$ reduction ratio in an exhaust emission control device of the invention is applicable to vehicles of various kinds.

The invention claimed is:

1. A method of determining an NO$_x$ reduction ratio in an exhaust emission control device in which a reducing agent is added upstream of an NO$_x$ reduction catalyst positioned in an exhaust passage of an engine comprising:

measuring a detected upstream NO$_x$ value at a location upstream of a position at which the reducing agent is added;

correcting said detected upstream NO$_x$ value based upon at least one of exhaust temperature and exhaust flow rate to provide a corrected upstream NO$_x$ value;

measuring a detected downstream NO$_x$ value at a location downstream of the catalyst;

correcting said detected downstream NO$_x$ value based upon at least one of exhaust temperature and exhaust flow rate to provide a corrected downstream NO$_x$ value;

determining the NO$_x$ reduction ratio based on the corrected upstream NO$_x$ value and the corrected downstream NO$_x$ value;

sensing exhaust temperature at a location upstream of said catalyst to provide an upstream exhaust temperature and using said upstream exhaust temperature to correct the detected upstream NO$_x$ value to provide the corrected upstream NO$_x$ value; and sensing exhaust temperature at a location downstream of said catalyst to provide a downstream exhaust temperature and using said downstream exhaust temperature to correct the detected downstream NO$_x$ value to provide the corrected downstream NO$_x$ value.

2. A method according to claim 1, wherein the detected upstream NO$_x$ value is corrected based on both exhaust temperature and exhaust flow rate to provide the corrected upstream NO$_x$ value.

3. A method according to claim 1, further including:

based on said NO$_x$ reduction ratio, determining a contributing amount of urea water contributing to reduction of NO$_x$; and based on an injection amount of urea water and said contributing amount of urea water, determining an adsorption amount of ammonia in the catalyst.

4. A method according to claim 1, wherein the detected downstream NO$_x$ value is corrected based on both exhaust temperature and exhaust flow rate to provide the corrected downstream NO$_x$ value.

5. A method according to claim 4, wherein the detected upstream NO$_x$ value is corrected based on both exhaust temperature and exhaust flow rate to provide the corrected upstream NO$_x$ value.

6. A method according to claim 1, including providing an upstream concentration sensor at a location upstream of introduction of the reducing agent to measure the detected upstream $NO_x$ value, and providing a downstream concentration sensor at a location downstream of the catalyst to measure the detected downstream $NO_x$ value.

7. A method according to claim 6, wherein at least one of said detected upstream $NO_x$ value and said detected downstream $NO_x$ value is also corrected based upon exhaust flow rate.

8. a method according to claim 7, wherein at least one of said detected upstream $NO_x$ value and said detected downstream $NO_x$ value is also corrected based on a distance between the upstream and downstream concentration sensors.

9. A method according to claim 1, wherein said corrected upstream $NO_x$ value is determined based on both the upstream exhaust temperature and exhaust flow rate.

10. A method according to claim 9, wherein the exhaust flow rate is estimated based on engine speed and fuel consumption.

11. A method according to claim 9, wherein the exhaust flow rate is estimated based on engine intake air flow and ambient temperature.

12. A method of determining an $NO_x$ reduction ratio in an exhaust emission control device in which a reducing agent is added upstream of an $NO_x$ reduction catalyst positioned in an exhaust passage of an engine comprising:
measuring a detected upstream $NO_x$ value at a location upstream of a position at which the reducing agent is added;
correcting said detected upstream $NO_x$ value based upon at least one of exhaust temperature and exhaust flow rate to provide a corrected upstream $NO_x$ value;
measuring a detected downstream $NO_x$ value at a location downstream of the catalyst;
correcting said detected downstream $NO_x$ value based upon at least one of exhaust temperature and exhaust flow rate to provide a corrected downstream $NO_x$ value;
determining the $NO_x$ reduction ratio based on the corrected upstream $NO_x$ value and the corrected downstream $NO_x$ value;
based on said $NO_x$ reduction ratio, determining a contributing amount of urea water contributing to reduction of $NO_x$;
based on an injection amount of urea water and said contributing amount of urea water, determining an adsorption amount of ammonia in the catalyst; and
wherein said corrected upstream $NO_x$ value is determined based on exhaust temperature upstream of said catalyst and said corrected downstream $NO_x$ value is determined based on exhaust temperature downstream of said catalyst.

13. A method according to claim 12, wherein at least one of said corrected upstream $NO_x$ value and said corrected downstream $NO_x$ value is determined using a time lag correction, and wherein said time lag correction is based upon exhaust flow rate and a distance between locations at which the detected upstream $NO_x$ value and the detected downstream $NO_x$ values are measured.

14. A method of determining an $NO_x$ reduction ratio in an exhaust emission control device in which a reducing agent is added upstream of an $NO_x$ reduction catalyst positioned in an exhaust passage of an engine comprising:
measuring a detected upstream $NO_x$ value at a location upstream of a position at which the reducing agent is added;
correcting said detected upstream $NO_x$ value based upon at least one of exhaust temperature and exhaust flow rate to provide a corrected upstream $NO_x$ value;
measuring a detected downstream $NO_x$ value at a location downstream of the catalyst;
correcting said detected downstream $NO_x$ value based upon at least one of exhaust temperature and exhaust flow rate to provide a corrected downstream $NO_x$ value;
determining the $NO_x$ reduction ratio based on the corrected upstream $NO_x$ value and the corrected downstream $NO_x$ value;
wherein at least one of said corrected upstream $NO_x$ value and said corrected downstream $NO_x$ value is determined using a time lag correction, and wherein said time lag correction is based upon exhaust flow rate and a distance between locations at which the detected upstream $NO_x$ value and the detected downstream $NO_x$ value are measured; and
wherein said corrected upstream $NO_x$ value is determined based on exhaust temperature upstream of said catalyst and said corrected downstream $NO_x$ value is determined based on exhaust temperature downstream of said catalyst.

15. A method of determining an $NO_x$ reduction ratio in an exhaust emission control device in which a reducing agent is added upstream of an $NO_x$ reduction catalyst positioned in an exhaust passage of an engine comprising:
measuring a detected upstream $NO_x$ value at a location upstream of a position at which the reducing agent is added;
correcting said detected upstream $NO_x$ value based upon at least one of exhaust temperature and exhaust flow rate to provide a corrected upstream $NO_x$ value;
measuring a detected downstream $NO_x$ value at a location downstream of the catalyst;
correcting said detected downstream $NO_x$ value based upon at least one of exhaust temperature and exhaust flow rate to provide a corrected downstream $NO_x$ value;
determining the $NO_x$ reduction ratio based on the corrected upstream $NO_x$ value and the corrected downstream $NO_x$ value;
wherein each of said corrected upstream $NO_x$ value and said corrected downstream $NO_x$ value are determined based on exhaust temperature, and further wherein at least one of said corrected upstream $NO_x$ value and said corrected downstream $NO_x$ value is also determined based on a time lag correction, and wherein said time lag correction is based on exhaust flow rate;
wherein the corrected upstream $NO_x$ value and the corrected downstream $NO_x$ value are calculated with distinct respective first and second equations; and
wherein said first equation has coefficients relating to exhaust temperature and the time lag correction, and the second equation has at least one coefficient relating to exhaust temperature.

16. A method according to claim 15, wherein the time lag correction is further based on a distance between upstream and downstream locations at which the detected upstream and downstream $NO_x$ values are measured.

* * * * *